(12) United States Patent
Kim

(10) Patent No.: US 11,066,072 B2
(45) Date of Patent: Jul. 20, 2021

(54) APPARATUS AND METHOD FOR ASSISTING DRIVING OF HOST VEHICLE

(71) Applicant: MANDO CORPORATION, Pyeongtaek-si (KR)

(72) Inventor: InHo Kim, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 204 days.

(21) Appl. No.: 16/410,777

(22) Filed: May 13, 2019

(65) Prior Publication Data

US 2019/0344791 A1 Nov. 14, 2019

(30) Foreign Application Priority Data

May 14, 2018 (KR) .................. 10-2018-0054835

(51) Int. Cl.
*B60W 30/18* (2012.01)
*B60W 40/04* (2006.01)

(52) U.S. Cl.
CPC ...... *B60W 30/18018* (2013.01); *B60W 40/04* (2013.01); *B60W 2400/00* (2013.01); *B60W 2510/10* (2013.01); *B60W 2520/10* (2013.01); *B60W 2540/10* (2013.01); *B60W 2540/12* (2013.01); *B60W 2554/801* (2020.02); *B60W 2554/804* (2020.02)

(58) Field of Classification Search
CPC ......... B60W 2400/00; B60W 2510/10; B60W 2520/04; B60W 2520/10; B60W 2540/10; B60W 2540/12; B60W 2554/801; B60W 2554/804; B60W 2555/60; B60W 2556/65; B60W 30/17; B60W 30/18018; B60W 40/04; B60W 50/14
See application file for complete search history.

(56) References Cited

U.S. PATENT DOCUMENTS

| 6,346,064 | B1 * | 2/2002 | Hada ..................... B60W 10/06 477/171 |
| 7,337,056 | B2 * | 2/2008 | Arai .................... B60K 31/0008 701/96 |
| 7,602,311 | B2 * | 10/2009 | Price ................... B60W 10/184 340/903 |
| 7,664,589 | B2 * | 2/2010 | Etori ..................... B60W 30/17 701/96 |
| 8,423,259 | B2 * | 4/2013 | Labuhn ........... B60W 30/18027 701/93 |
| 10,371,811 | B2 * | 8/2019 | Shokonji ................. G01S 17/86 |
| 2002/0026274 | A1 * | 2/2002 | Morizane ........... B60K 31/0008 701/93 |

(Continued)

*Primary Examiner* — Babar Sarwar
(74) *Attorney, Agent, or Firm* — Morgan, Lewis & Bockius LLP

(57) ABSTRACT

The present disclosure provides a driving assist apparatus including a host vehicle stop determiner for determining the stop state of a host vehicle, a preceding vehicle stop determiner for determining the stop state of the preceding vehicle, a preceding vehicle start determiner for determining the start of the preceding vehicle after the stop of the preceding vehicle based on a speed change information of the preceding vehicle and a distance change information between the host vehicle and the preceding vehicle, and a start notifier for notifying the start of the preceding vehicle after the stop to a driver of the host vehicle.

17 Claims, 6 Drawing Sheets

(56) References Cited

U.S. PATENT DOCUMENTS

| | | | |
|---|---|---|---|
| 2005/0216169 A1* | 9/2005 | Arai | B60K 31/0008 |
| | | | 701/96 |
| 2009/0265071 A1* | 10/2009 | Isaji | B60W 30/16 |
| | | | 701/70 |
| 2010/0004839 A1* | 1/2010 | Yokoyama | G08G 1/052 |
| | | | 701/70 |
| 2010/0280729 A1* | 11/2010 | Samsioe | B60W 10/196 |
| | | | 701/93 |
| 2012/0065863 A1* | 3/2012 | Takagi | B60W 30/14 |
| | | | 701/96 |
| 2014/0222280 A1* | 8/2014 | Salomonsson | B60Q 9/008 |
| | | | 701/28 |
| 2015/0266476 A1* | 9/2015 | Sangameswaran | B60W 10/04 |
| | | | 701/93 |
| 2017/0076395 A1* | 3/2017 | Sedlik | G08G 1/096741 |
| 2017/0206788 A1* | 7/2017 | Hu | G08G 1/09626 |
| 2017/0210378 A1* | 7/2017 | Gunaratne | B60W 30/0953 |
| 2017/0369055 A1* | 12/2017 | Saigusa | G08G 1/0116 |
| 2018/0038952 A1* | 2/2018 | Shokonji | G01S 15/86 |
| 2018/0126931 A1* | 5/2018 | Derag Rden | G05D 1/0295 |
| 2018/0148054 A1* | 5/2018 | Urano | B60W 30/14 |
| 2018/0174380 A1* | 6/2018 | Kataoka | B62D 15/0265 |
| 2018/0222480 A1* | 8/2018 | Shokonji | B60W 50/14 |
| 2019/0283764 A1* | 9/2019 | Morimoto | B60W 50/16 |

* cited by examiner

APPARATUS AND METHOD FOR ASSISTING DRIVING OF HOST VEHICLE

CROSS REFERENCE TO RELATED APPLICATION

This application claims priority from Korean Patent Application No. 10-2018-0054835, filed on May 14, 2018, which is hereby incorporated by reference for all purposes as if fully set forth herein.

BACKGROUND OF THE INVENTION

1. Field of the Invention

The present disclosure relates to a driving assist apparatus and method for a vehicle, and more particularly, to an apparatus and method for informing a driver of a start time of a preceding vehicle existing in front of the host vehicle.

2. Description of the Prior Art

Recently, a several types of the driver assistance systems (DAS) or the advanced driver assistance systems (ADAS) have been developed to provide drivers with specific functions for stability and convenience of the driving.

In this regard, a technique for notifying to driver of the host vehicle when the preceding vehicle located in the front of the host vehicle is temporarily stopped and then restarting is also researched as a kind of the DAS or ADAS with regard to an autonomous driving technology.

However, there may be a limitation that a real vehicle driving environment such as road conditions is not fully considered when implementing the technique for informing the departure of the preceding vehicle.

SUMMARY OF THE INVENTION

For this background, an object of the present disclosure is to provide a system for notifying the driver of the host vehicle of the start of the preceding vehicle in consideration of the driving environment of the vehicles.

In accordance with an aspect of the present disclosure, there is provided an apparatus for assisting driving of a host vehicle, the apparatus including: at least one vehicle sensor configured to mount on the host vehicle to detect the driving state of the host vehicle and to acquire information of the exterior of the host vehicle; and a controller configured to communicably be connected to the at least one vehicle sensor and to perform a preceding vehicle following function; wherein the controller comprising: a controller is operable to receive information of the host vehicle and a preceding vehicle in front of the host vehicle from at least one vehicle sensor, to determine the stop state of the host vehicle based on at least one of a speed information of the host vehicle, an accelerator pedal state information of the host vehicle, a brake pedal state information of the host vehicle and a transmission gear state information of the host vehicle, to determine the stop state of the preceding vehicle based on information of the stop state of the host vehicle, a speed information of the preceding vehicle, a distance information between the host vehicle and the preceding vehicle, to determine the start of the preceding vehicle after the stop of the preceding vehicle based on a speed change information of the preceding vehicle and a distance change information between the host vehicle and the preceding vehicle, and to notify the start of the preceding vehicle after the stop to a driver of the host vehicle if the preceding vehicle is determined to restart after the stop.

In accordance with another aspect of the present disclosure, there is provided a controller or a preceding vehicle start notification apparatus including: a host vehicle stop determiner configured to determine the stop state of a host vehicle based on at least one of a speed information of the host vehicle, an accelerator pedal state information of the host vehicle, a brake pedal state information of the host vehicle and a transmission gear state information of the host vehicle; a preceding vehicle stop determiner configured to determine the stop state of the preceding vehicle based on information of the stop state of the host vehicle, a speed information of the preceding vehicle, a distance information between the host vehicle and the preceding vehicle; a preceding vehicle start determiner configured to determine the start of the preceding vehicle after the stop of the preceding vehicle based on a speed change information of the preceding vehicle and a distance change information between the host vehicle and the preceding vehicle; and a start notifier configured to notify the start of the preceding vehicle after the stop to a driver of the host vehicle if the preceding vehicle is determined to restart after the stop.

In accordance with another aspect of the present disclosure, there is provided a method for assisting driving of a host vehicle, the method including: determining the stop state of the host vehicle based on at least one of a speed information of the host vehicle, an accelerator pedal state information of the host vehicle, a brake pedal state information of the host vehicle and a transmission gear state information of the host vehicle; determining the stop state of a preceding vehicle in front of the host vehicle based on information of the stop state of the host vehicle, a speed information of the preceding vehicle, a distance information between the host vehicle and the preceding vehicle; determining the start of the preceding vehicle after the stop of the preceding vehicle based on a speed change information of the preceding vehicle and a distance change information between the host vehicle and the preceding vehicle; and notifying the start of the preceding vehicle after the stop to a driver of the host vehicle if the preceding vehicle is determined to restart after the stop.

As described below, according to the present disclosure, it is possible to notify the departure information or start information of the preceding vehicle considering the driving environment to the driver of the host vehicle.

DETAILED DESCRIPTION OF THE EXEMPLARY EMBODIMENTS

Figure 1:
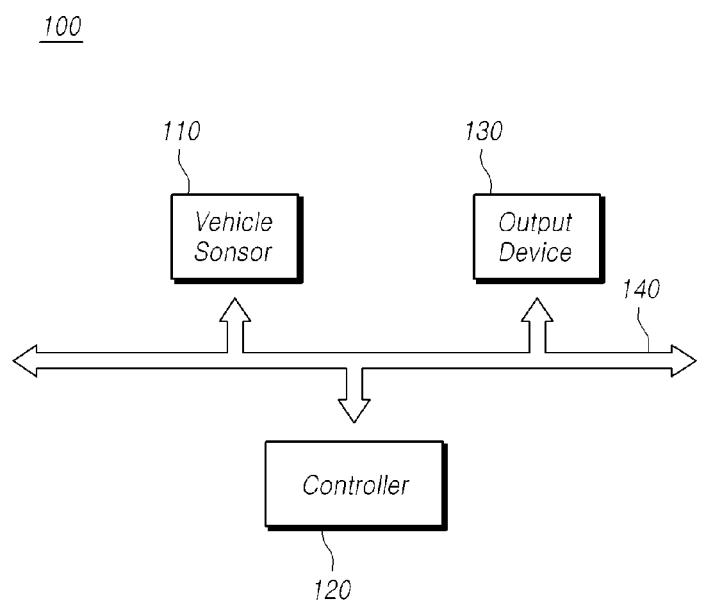
FIG. 1 is a diagram for illustrating the configuration of a preceding vehicle start notification system according to an embodiment of the present disclosure.

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

The vehicle in this specification may be a concept including a car, a motorcycle, and the like. Further, the vehicle may be a concept including both an internal combustion engine vehicle having an engine as a power source, a hybrid vehicle having an engine and an electric motor as a power source, and an electric vehicle having an electric motor as a power source.

FIG. 1 is a diagram for illustrating the configuration of a preceding vehicle start notification system according to an embodiment of the present disclosure.

As shown in FIG. 1, the preceding vehicle start notification system 100 according to an embodiment may include a vehicle sensor 110, a controller 120, an output device 130 and a communication path 140.

The preceding vehicle start notification system of FIG. 1 may include an embodiment of the driving assistance device of the present disclosure. That is, the preceding vehicle departure notification system 100 of FIG. 1 including the vehicle sensor 110 and the controller 120 may be an example of the driving assistance device of the vehicle.

The vehicle sensor 110 may generate information about the host vehicle itself, other vehicle information about vehicles adjacent to the host vehicle, traffic signal information about the traffic signal around the host vehicle, and may transmit the generated information to the controller 120.

In one embodiment, the vehicle sensor 110 may be mounted on the host vehicle and may detect the driving state of the host vehicle to generate the driving data of the host vehicle.

Specifically, the vehicle sensor 110 may generate the driving data including all information for confirming the driving state of the host vehicle such as the steering angle, the shift gear state or transmission gear state, the accelerator pedal state, the turn signal state, the brake pedal state, the navigation information and GPS position information.

In addition, the vehicle sensor 110 may transmit the generated driving data to the controller 120.

That is, the vehicle sensor 110 may include at least one vehicle dynamics sensor for detecting various data in the host vehicle such as a vehicle speed sensor, a steering angle sensor and the like.

In addition, the vehicle sensor 110 may be mounted on the vehicle, and in addition to the host vehicle information, may further generate circumstance information including information on the other vehicle existing in the vicinity of the host vehicle by detecting the external condition of the host vehicle.

Specifically, the vehicle sensor 110 may generate preceding vehicle information such as the speed of the preceding vehicle that travel ahead of the host vehicle, the distance to the host vehicle from the preceding vehicle, and may transmit the generated information to the controller 120.

This vehicle sensor 110 may include an imaging sensor such as a camera, a radar sensor, a lidar sensor, ultrasonic wave sensor and an infrared sensor or the like.

The vehicle sensor 110 may generate other vehicle information. Specifically, the vehicle sensor 110 may generate the other vehicle information about the other vehicle traveling adjacent to the host vehicle such as the speed of the other vehicle, the moving distance the other vehicle, the distance between the other vehicles, the distance to the host vehicle, the number of other vehicles and the like, and may transmit the generated other vehicle information to the controller 120.

For this purpose, the vehicle sensor 110 may include an imaging sensor such as a camera, a radar sensor, a lidar sensor, ultrasonic wave sensor and an infrared sensor or the like.

In one embodiment, the vehicle sensor 110 may generate traffic information by detecting nearby traffic condition.

Specifically, the vehicle sensor 110 may generate traffic information including all the information which can be used to check the state of the traffic signal in front of the host vehicle, and may transmit the generated traffic information to the controller.

For this purpose, the vehicle sensor 110 may include an image sensor such as a camera.

The vehicle sensor 110 may capture an image of a traffic light in front of the host vehicle and transmit the generated traffic light image to the controller.

In addition, the vehicle sensor 110 may include a communication system that receives traffic information from a traffic system that controls a traffic signal light, and transmits the received traffic information to the controller of the host vehicle.

In one embodiment, the preceding vehicle start notification system 100 may further include a communication unit. The communication unit may be operable to perform vehicle-to-vehicle (V2V) communication, vehicle-to-infrastructure communication (V2I), vehicle-to-server communication and intra-vehicle communication. For this purpose, the communication unit may include a transmitting unit and a receiving unit. For example, the communication unit may be implemented as V2V communication system.

The V2X communication system may be used for communication between V2V (Vehicle to Vehicle), V2I (Vehicle to Infrastructure), V2N (Vehicle to Nomadic Device), V2P (Vehicle to Pedestrian) and the like. The V2X communication may be performed based on Dedicated Short-Range Communications (DSRC) specification.

Alternatively, V2X communication system may utilize the communication technology based on a wireless communication access in vehicle environment (WAVE) or a IEEE 802.11p communication standard using 5.9 GHz frequency band, but is not limited thereto, and it should be understood that the V2X communication system may utilize all inter-vehicle communication that will be developed now or in the future.

In one embodiment, the V2X communication system may receive the information on the traffic signal in front of the host vehicle from a infrastructure server covering the area including the position of the host vehicle, and may transit the received information on the traffic signal to the controller of the preceding vehicle start notification system.

The controller 120 of the preceding vehicle start notification system 100 may perform a preceding vehicle following control in which the host vehicle travels while maintaining a constant distance from the preceding vehicle.

In addition, the controller 120 may perform the further functions including a function of receiving information of the host vehicle and a preceding vehicle in front of the host vehicle from vehicle sensor, a function of determining the stop state of the host vehicle based on at least one of a speed information of the host vehicle, an accelerator pedal state information of the host vehicle, a brake pedal state information of the host vehicle and a transmission gear state information of the host vehicle, a function of determining the stop state of the preceding vehicle based on information of the stop state of the host vehicle, a speed information of the preceding vehicle, a distance information between the host vehicle and the preceding vehicle, a function of determining the start of the preceding vehicle after the stop of the preceding vehicle based on a speed change information of the preceding vehicle and a distance change information between the host vehicle and the preceding vehicle, and a function of notifying the start of the preceding vehicle after the stop to a driver of the host vehicle if the preceding vehicle is determined to restart after the stop.

This controller 120 may be communicably connected to the vehicle sensor 110 and may generate and output a signal for controlling the operation of various driver assistance systems included in the host vehicle by using information detected at the vehicle sensor 110.

For example, the controller 120 may perform a preceding vehicle following function of the host vehicle that follows the preceding vehicle while maintaining a certain distance from the preceding vehicle. This preceding vehicle following control may be expressed as an adaptive cruise control (ACC) or a smart cruise control (SCC).

Further, the controller 120 may further perform the function for other types of the driver assistance system such as a blind spot detection (BSD) system, a lane maintenance assistant system (LKAS), an adaptive smart cruise control (ASCC) system, a lane departure warning system (LDWS), a lane change assistance system (LCAS) and so on.

The term and names of the driver assistance systems performed by the controller described herein are only illustrative and not limited thereto.

In addition, the controller 120 may include an autonomous driving system for autonomous driving of the host vehicle.

In addition, the controller 120 may be implemented as an integrated controller capable of simultaneously controlling a plurality of driver assistance systems as a single unit, and may be expressed by a domain control unit (DCU).

The controller 120 may control the output device 130 to determine whether the preceding vehicle has started and to output the determination result in a form recognizable by the driver. Details of the controller 120 will be described later with reference to FIGS. 2 to 6.

The output device 130 may output information on the start of the preceding vehicle so that the driver of the host vehicle can recognize the start of the preceding vehicle through visual sense, tactile sense or auditory sensor.

In one embodiment, the output device 130 may be a display device capable of outputting the image information on the start of the preceding vehicle, so that the driver can visually recognize the start of the preceding vehicle by the image information.

In one embodiment, the output device 130 may be an audio device. At this case, the output device 130 may output the audible information about whether the preceding vehicle is started or not so that the driver can recognize the start of the preceding vehicle by the audible information.

In one embodiment, the output device 130 may be a haptic device capable of outputting tactile information on the start of the preceding vehicle through the vibration of a steering wheel, a seat, or the like, so that the driver can tactically recognize the start of the preceding vehicle by the tactile information.

The controller 120 may control the vehicle driving unit to start or stop the vehicle based on the result of determination of the start of the preceding vehicle.

The communication path 140 may include all types of the common vehicle communication means such as CAN communication, and may enable data communication between each element configuring the preceding vehicle start notification system according to the embodiments.

Figure 2:
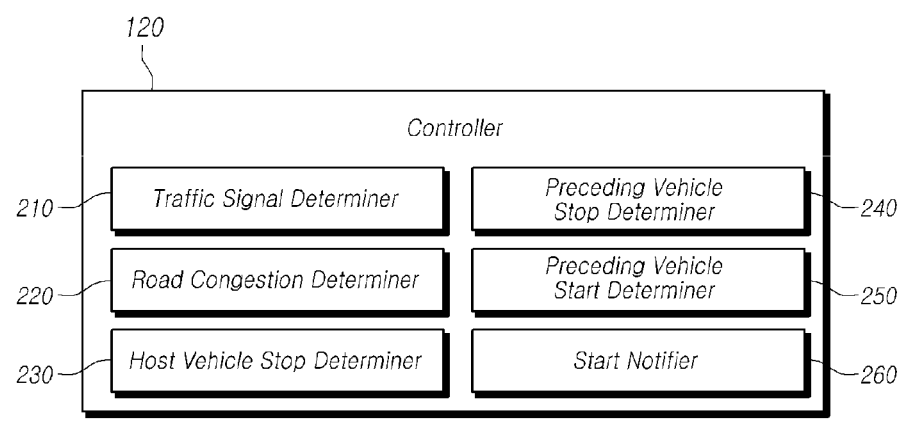
FIG. 2 is a block diagram of a controller in accordance with one embodiment of the present disclosure.

FIG. 2 is a block diagram of a controller in accordance with one embodiment of the present disclosure.

Referring to FIG. 2, the controller 120 may include the traffic signal determiner 210, the road congestion determiner 220, the host vehicle stop determiner 230, the preceding vehicle stop determiner 240, the preceding vehicle start determiner 250 and the start notifier 260.

The traffic signal determiner 210 may check and identify the state of the traffic signal related to the lane on which the vehicle is traveling, i.e., the U-turn signal, the left turn signal, the right turn signal, the straight line signal, stop signal and the U-turn signal and so on.

In one embodiment, the traffic signal determiner 210 may receive traffic information from the vehicle sensor 110 and determine a traffic signal state (a left turn signal, a right turn signal, a straight line signal, a stop signal, U-turn signal, etc.) related to a lane on which the vehicle travels based on the received traffic information.

In another embodiment, the traffic signal determiner 210 may receive the traffic information around the host vehicle from the infrastructure server covering the position of the host vehicle by using V2X communication unit, and may determine a traffic signal state related to a lane on which the vehicle travels based on the received traffic information.

In one embodiment, the traffic signal determiner 210 may indirectly confirm traffic signals such as U-turn signal, left turn signal, right turn signal, straight line signal, and stop signal of the lane on which the vehicle is traveling based on the traffic information and the traveling path of the host vehicle.

For example, the traffic signal determiner 210 may determine that the left turn traffic light or left turn signal is turned-on if the host vehicle turns left in a lane where both the left turn and the straight travel are possible.

The road congestion determiner 220 may confirm whether the road on which the host vehicle is traveling is in a congested state. Specifically, the road congestion determiner 220 may check or confirm the congestion state of the road based on the speed of the host vehicle received from the vehicle sensor 110, the speed of another vehicle adjacent to the host vehicle, the distance between the host vehicle and another vehicle, the distance between other vehicles adjacent to the host vehicle, the number of another vehicle exiting around the host vehicle, etc.

For example, if the speed of the another vehicles adjacent to the host vehicle is equal to or lower than a predetermined congestion velocity, and/or the distance between the other vehicles or the distance between the host vehicle and the other vehicle is equal to or less than a predetermined congestion distance, and/or the number of other vehicles present around the host vehicle is greater than or equal to a predetermined threshold value, the road congestion determiner 220 may determine the corresponding road is in a congestion state.

Alternatively, the road congestion determiner 220 may determine the congestion state of the road on which the host vehicle is traveling based on information provided from a navigation device for guiding the traveling route.

The host vehicle stop determiner 230 may determine the stop state of a host vehicle, that is whether the host vehicle is stopped or not.

Specifically, the host vehicle stop determiner 230 may determine the stop state of a host vehicle based on the driving data including the speed, the accelerator pedal state, the brake pedal stat and the like for the host vehicle.

For example, if the speed of the host vehicle is less than a host vehicle stopping speed (for example, 2 km/h), the host vehicle stop determiner 230 may determine that the host vehicle is in the stop state. In addition, when the vehicle speed is less than a predetermined value and the brake pedal is pressed at a predetermined pressure or more, the host vehicle stop determiner 230 may determine the stop state of the host vehicle.

Alternatively, the host vehicle stop determiner 230 may determine that the host vehicle is in the stop state if the speed of the host vehicle is maintained at the predetermined host vehicle stopping speed or lower and is maintained for a predetermined vehicle stopping time (e.g., 3 seconds) or more.

Alternatively, if a plurality of conditions including a condition that the speed of the host vehicle is equal to or lower than the predetermined host vehicle stopping speed, a condition that the transmission gear is in the drive gear state, and a condition that the accelerator pedal is in the off-state are maintained for a predetermined host vehicle stopping time (e.g., 3 seconds) or more are satisfied, the host vehicle stop determiner 230 may determine that the host vehicle is in the stop state.

The host vehicle stop determiner 230 may determine the stop state of the host vehicle by further considering a traffic signal in front of the host vehicle.

For example, if the condition that the speed of the host vehicle is equal to or lower than the predetermined host vehicle stopping speed is maintained for a predetermined vehicle stopping time or more, and if the condition that the traffic signal in front of the host vehicle is a stop signal is satisfied, the host vehicle stop determiner 230 may determine that the host vehicle is in the stop state.

The preceding vehicle stop determiner 240 may confirm whether the preceding vehicle is stopped or the stop state of the preceding vehicle.

Specifically, the preceding vehicle stop determiner 240 may determine the stop state of the preceding vehicle based on the stop state of the host vehicle, the speed of the preceding vehicle, the distance between the host vehicle and the preceding vehicle and the traffic signal and the like.

The preceding vehicle stop determiner 240 may determine the preceding vehicle is in the stop state if the speed of the preceding vehicle is equal to or less than a predetermined preceding vehicle stopping speed (for example, 2 km/h).

Alternatively, if the condition that the speed of the preceding vehicle is equal to or lower than the predetermined preceding vehicle stopping speed is maintained for a predetermined preceding vehicle stopping time (e.g. 2 seconds) or more, the preceding vehicle stop determiner 240 may determine the stop of the preceding state.

Alternatively, if the speed of the preceding vehicle is equal to or lower than the predetermined preceding vehicle stopping speed and the distance between the host vehicle and the preceding vehicle is equal to or less than the predetermined preceding vehicle stopping distance (for example, 30 m), the preceding vehicle stop determiner 240 may determine that the preceding state is in the stop state.

In addition, in case that the host vehicle stop determiner 230 determines that the host vehicle is in the stop state, the preceding vehicle stop determiner 240 may determine the stop state of the preceding vehicle based on the speed of the preceding vehicle, the distance between the host vehicle and the preceding vehicle, and the maintaining time of this speed or this distance.

The preceding vehicle start determiner 250 may determine the start of the preceding vehicle after the stop.

Specifically, the preceding vehicle start determiner 250 may determine whether the preceding vehicle departs or start based on the speed change of the preceding vehicle and the distance change between the host vehicle and the preceding vehicle after the preceding vehicle is determined to be stopped.

Here, the start state of the preceding vehicle may include a situation in which the host vehicle can move in consideration of the traffic signal, the preceding vehicle, and the distance to the preceding vehicle, and therefore is not limited to the case that the preceding vehicle moves.

In one embodiment, the preceding vehicle start determiner 250 may determine the start of the preceding vehicle based on the speed change of the preceding vehicle. For example, if the speed of the preceding vehicle is equal to or greater than a predetermined start speed (for example, 10 km/h) and/or the preceding vehicle is accelerated for a predetermined acceleration time (for example, 5 seconds), the preceding vehicle start determiner 250 may determine that the preceding vehicle starts.

In addition, the preceding vehicle start determiner 250 may determine the start of the preceding vehicle based on the distance change between the host vehicle and the preceding vehicle. For example, if the distance between the preceding vehicle and the host vehicle is equal to or greater than a predetermined start distance (e.g., 10 m) and the distance change between the preceding vehicle and the host vehicle is maintained for a predetermined distance changing time (e.g., 5 seconds), the preceding vehicle start determiner 250 may determine that the preceding vehicle starts.

In one embodiment, the preceding vehicle start determiner 250 may determine that the preceding vehicle start after stop when at least one of the conditions of the speed change of the preceding vehicle and the distance change from the host vehicle is satisfied.

In addition, the preceding vehicle start determiner 250 may determine that the preceding vehicle does not start if the traffic signal in front of the host vehicle is a stop signal regardless of other conditions.

For example, if the traffic signal in front of the host vehicle is a stop signal, it can be determined that the preceding vehicle has not started even if the preceding vehicle moves greater than the predetermined start distance.

The preceding vehicle start determiner 250 may reset the reference value of the speed change of the preceding vehicle and the distance change with respect to the host vehicle in the case of the congestion state of the road.

For example, in the case of a road congestion state, the preceding vehicle start determiner 250 may determine the start state of the preceding vehicle by changing the reference value of the predetermined acceleration time from 5 seconds to 2 seconds.

In the present disclosure, the host vehicle stopping speed and the host vehicle stopping time as a threshold value or threshold value for determining the stop state of the host vehicle, the preceding vehicle stopping speed, the preceding vehicle stopping time, the start speed, the acceleration time, the start distance and the distance changing time as the reference value or threshold value for determining the stop state or start state of preceding vehicle may be set depending on the driving environment of the vehicle or the driving habit of the driver.

In one embodiment, the preceding vehicle start notification system may collect and store information on the driver's driving habits in a state in which the preceding vehicle following function is not activated. In addition, when the preceding vehicle following function or the preceding vehicle start notification function is activated, the reference value or the threshold value for determining the stop state or start state of preceding vehicle and host vehicle may be reset by considering information on the driving habit of the driver stored.

For example, the preceding vehicle start notification system may learn the average value of the start time of host vehicle after the preceding vehicle starts, the average value of the distance between the preceding vehicle and the host vehicle when the host vehicle starts after the preceding vehicle starts in state that the preceding vehicle following function is not activated, and may determine the driver's driving habit. Therefore, the preceding vehicle start notification may be provided at a proper timing corresponding to the driver's driving habit.

In one embodiment, the vehicle sensor 110 may detect information about another vehicle located on an adjacent lane of the lane on which the host vehicle travels, for example, information on the speed of another vehicle located on the adjacent lane or the distance between the other vehicles on the adjacent lane. The vehicle sensor 110 may transmit information about another vehicle located on an adjacent lane to the controller 120.

The preceding vehicle start determiner 250 of the controller 120 may reset the reference values (e.g. the start speed, the acceleration time, the start distance and the distance changing time etc.) for determining the speed change of the preceding vehicle or the distance change between the host vehicle and the preceding vehicle based on the information about the another vehicle located in the adjacent lane.

For example, if the speed of the other vehicle located in the adjacent lane of the vehicle is equal to or higher than a predetermined speed or the speed change of the other vehicle is increased, the preceding vehicle start determiner 250 may adjust the reference values for determining the start of the preceding vehicle departure. Therefore, the preceding vehicle start notification timing may be delayed thereby reduce the accident risk.

Accordingly, the preceding vehicle start notification system according to the present embodiment may provide an optimal driving stability feeling to the driver by considering or reflecting the driving habit of the driver in determining the preceding vehicle start notification timing.

In addition, the preceding vehicle start notification system according to the present embodiment may provide a vehicle driving control suitable for a traffic environment by considering or reflecting the traveling environment of the road on which the vehicle travels.

The start notifier 260 may notify the start of the preceding vehicle to the driver when it is determined that the preceding vehicle has started.

Specifically, if it is determined that the preceding vehicle has started, the start notifier 260 may control the output device 130 to output information on the start of the preceding vehicle so that the driver can recognize the start of the preceding vehicle through the visual sense, the auditory sense, the tactile sense, etc.

Figure 3:
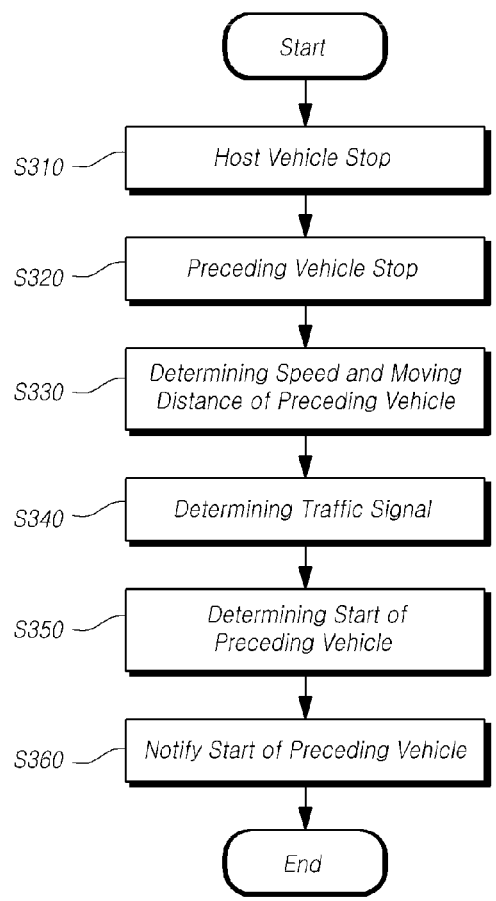
FIG. 3 is a flowchart of a preceding vehicle start notification method according to an embodiment of the present disclosure.

FIG. 3 is a flowchart of a preceding vehicle start notification method according to an embodiment of the present disclosure.

Hereinafter, the method will be described by way of an example performed by the controller 120 shown in FIG. 1, and it is apparent that the foregoing description of the controller 120 can applied to the above method.

In step S310, the stop of the host vehicle may be determined. Specifically, the controller 120 may determine the stop state of the host vehicle based on the driving data including the speed, the accelerator pedal state, and the transmission gear state of the host vehicle and so on.

In step S320, the stop of the preceding vehicle may be determined. Specifically, the controller 120 may determine the stop state of the preceding vehicle based on the stop state of the host vehicle, the speed of the preceding vehicle, the distance between the host vehicle and the preceding vehicle, the traffic signal in front of the host vehicle, and the like.

In step S330, the speed change of the preceding vehicle or the like may be monitored. Specifically, after determining that the preceding vehicle is stopped, the controller 120 may monitor the speed change of the preceding vehicle, the distance change or the distance change time between the host vehicle and the preceding vehicle, the traffic signal, and the like.

In step S340, the traffic signal may be determined. Specifically, the controller 120 may determine whether the host vehicle can proceed in the direction in which the host vehicle is traveling based on the traffic signal information.

In step S350, the start state of the preceding vehicle may be determined. Specifically, the controller 120 may determine whether the preceding vehicle starts after stop based on the speed change of the preceding vehicle, the distance change between the preceding vehicle and the host vehicle, and the like.

At this case, the start speed and the acceleration time may be used to confirm the speed change of the preceding vehicle, and the start distance and the distance changing time may be used to confirm the distance change between the preceding vehicle and the host vehicle.

In the present disclosure, the reference values with regard to the predetermined host vehicle speed, the preceding vehicle speed and the distance between the host vehicle and the preceding vehicle may be changed or reset according to the driving environment of the vehicle, the driving habit of the driver, or the like.

In addition, the preceding vehicle start notification system may collect and store information on the driver's driving habit while the preceding vehicle following function is not activated, and when the preceding vehicle following function or the preceding vehicle start notification function is activated, the reference values as above may be determined by considering or reflecting information on the driving habit of the driver.

In one embodiment, the controller 120 may determine that the preceding vehicle has not started in the case of the traffic signal prohibiting the progress of the host vehicle.

In step S360, the start of the preceding vehicle may be notified. Specifically, when it is determined that the preceding vehicle has started, the controller 120 may control the output device 130 to output information on the start of the preceding vehicle so that the driver can recognize the start of the preceding vehicle.

Figure 4:
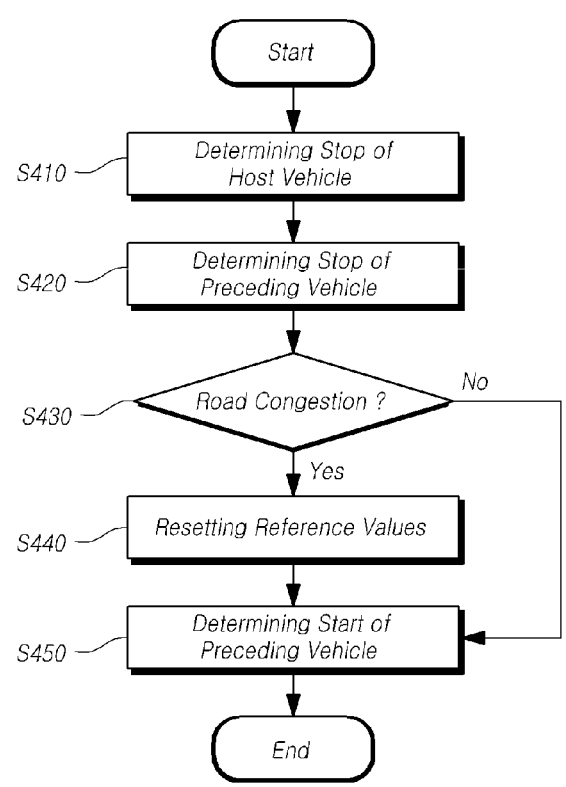
FIG. 4 is a flowchart of a preceding vehicle start notification method in a road congestion situation according to an embodiment of the present disclosure.

FIG. 4 is a flowchart of a preceding vehicle start notification method in a road congestion situation according to an embodiment of the present disclosure.

Hereinafter, the method will be described by way of an example performed by the controller 120 shown in FIG. 1, and it is apparent that the foregoing description of the controller 120 can applied to the above method.

In step S410, the stop of the host vehicle may be determined. Specifically, the controller 120 may determine whether the host vehicle is stopped based on the driving data including the speed of the host vehicle, the accelerator pedal state and the like.

In step S420, the stop of the preceding vehicle may be determined. Specifically, the controller 120 may determine whether the preceding vehicle is stopped based on the speed of the preceding vehicle, the distance between the preceding vehicle and the host vehicle, the traffic signal, and the like.

In step S430, the congestion state of the road may be determined. Specifically, the controller 120 may determine whether the road on which the vehicle is traveling is in a congestion state based on the speed of the other vehicle around the host vehicle, the distance between the other vehicles around the host vehicle, the number of other vehicles existing around the host vehicle, and the like.

In one embodiment, the controller 120 may determine that the road is in a congestion condition if at least one condition of the condition that the speed of the other vehicle existing around the host vehicle is equal to or lower than a predetermined congestion speed, and the condition that the distance between the other vehicles around the host vehicle is less than a predetermined congestion interval is satisfied. For example, the controller 120 may determine that a road congestion situation occurs if the speed of the other vehicle is 5 km/h or less and/or the distance between other vehicles is 3 m or less.

In step S440, the reference value may be reset. Specifically, if it is determined that the road in which the host vehicle travels is in the congestion state, the controller 120 may change or reset the reference values related to the time and the distance for determining the stop of the hos vehicle, the stop of the preceding vehicle, the start of the preceding vehicle. In other words, if it is determined that the vehicle is on the road of the congestion state, the controller 120 may reset or adjust that the reference values including the start speed and the acceleration time (maintaining time) of the preceding vehicle for determining the speed change of the preceding vehicle, and the reference values including the start distance and the distance changing time for determining the distance change between the preceding vehicle and host vehicle.

As an example, in a road congestion state, the controller 120 may reset the time-related reference values smaller or reset the distance-related reference values smaller. Therefore, in the road congestion state, the timing of the preceding vehicle start notification may be advanced.

In addition, the controller 120 may reset the time-related reference values or the distance-related reference values for determining the speed change or the distance change of the preceding vehicle by using n the information on the other vehicle located on the adjacent lane of the lane on which the host vehicle travel received from the vehicle sensor.

For example, if it is determined that the speed of the other vehicle located in the adjacent lane of the host vehicle is equal to or higher than a predetermined speed or the speed change of the other vehicle located in the adjacent lane of the host vehicle is increased, the controller 120 may adjust the reference values for determining the start of the preceding vehicle, thereby it is possible to delay the notification timing and reduce the risk of accidents.

In step S440, it may be determined whether the preceding vehicle has started or not. Specifically, in the case of a road congestion situation, the controller 120 may determine the start state of the preceding vehicle based on the adjusted reference values.

Next, the start of the preceding vehicle may be notified. Specifically, if it is determined that the preceding vehicle starts, the controller 120 may control the output device 130 to output the corresponding information in order the driver to recognize the start of the preceding vehicle.

Figure 5:
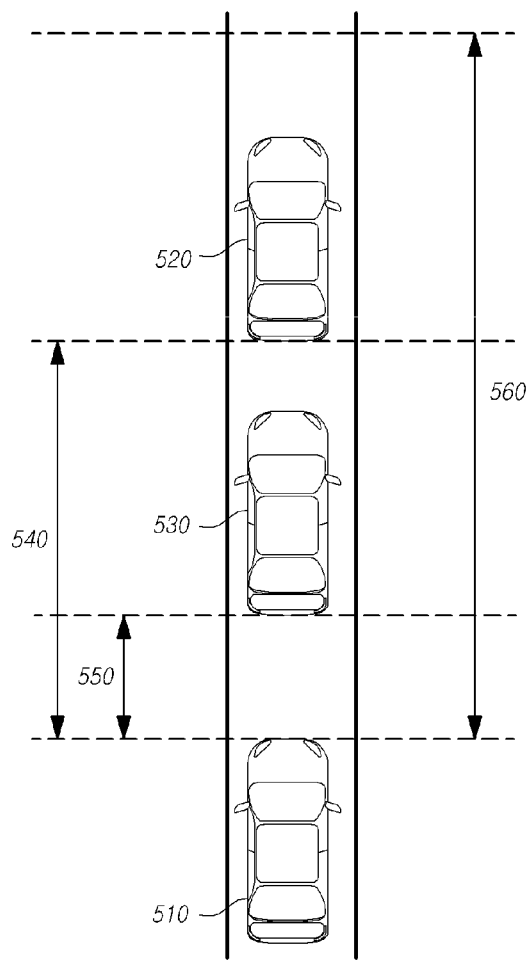
FIG. 5 is a diagram for explaining an example of determining the start state of the preceding vehicle based on the distance information according to an embodiment of the present disclosure.

FIG. 5 is a diagram for explaining an example of determining the start state of the preceding vehicle based on the distance information according to an embodiment of the present disclosure.

Referring to FIG. 5, the preceding vehicle 520 moves forward after a time t has elapsed after the host vehicle 510 and the preceding vehicle 530 are stopped is shown.

The distance 550 between the host vehicle and the preceding vehicle in the stop state of the subject vehicle and the preceding vehicle is changed to the distance 540 between the host vehicle and the preceding vehicle 530 that has moved forward after time t has elapsed.

At this case, the controller 120 may determine that the preceding vehicle has started if the distance 540 between the host vehicle 510 and the preceding vehicle 520 after the time t is equal to or greater than the predetermined start distance.

In addition, the controller 120 may determine that the preceding vehicle has started if the state that the distance between the preceding vehicle and the child vehicle is equal to or greater than a predetermined start distance is maintained for the predetermined distance change time (for example, 5 seconds).

Figure 6:
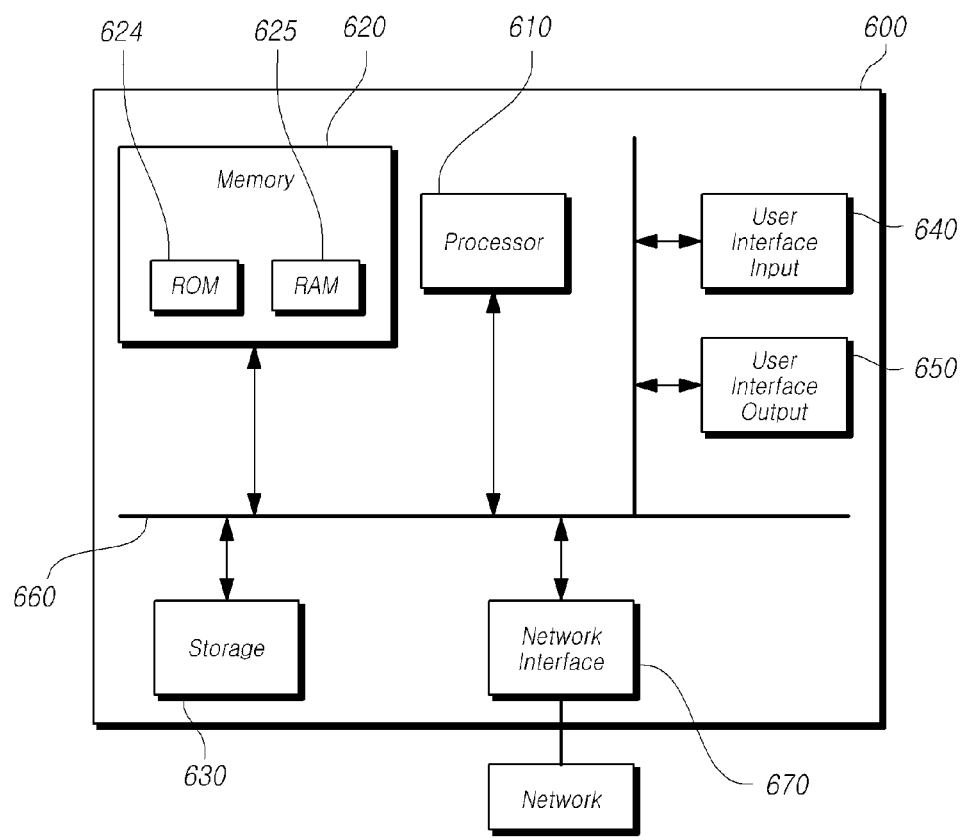
FIG. 6 is a block diagram of a driving assistance apparatus of the host vehicle according to another embodiment of the present disclosure.

FIG. 6 is a block diagram of a driving assistance apparatus of the host vehicle according to another embodiment of the present disclosure.

As shown in the FIG. 6, a computer system 600 as a driving assisting apparatus or the preceding vehicle notification apparatus may include at least one element of a processors 610 which corresponds to the controller 120 of FIGS. 1 and 2, a memory 620, a storage 630, a user interface input 640, and a user interface output 650, which are capable of communicating with one another via a communication bus 660. In addition, the computer system 600 may also include a network interface 670 for connecting to a network.

The processor 610 may be a CPU or a semiconductor device that executes processing instructions stored in memory 620 and/or in the storage 630.

Memory 620 and storage 630 may include various types of volatile/non-volatile storage media. For example, the memory may include ROM 624 and RAM 625.

Accordingly, embodiments of the present disclosure may be embodied in a computer-implemented method or non-volatile computer storage medium storing computer-executable instructions. The computer-executable instructions may be executed by the processor to perform the method according to at least one embodiment of the present disclosure.

In the apparatus for assisting driving of the host vehicle having such a hardware configuration, a software or a program for performing the functions of the controller 120 or the traffic signal determiner 210, the road congestion determiner 220, the host vehicle stop determiner 230, the preceding vehicle stop determiner 240, the preceding vehicle start determiner 250 and the start notifier 260 may be stored or installed in the memory 620 or the storage unit 630, and may be executed by the processor 610.

More particularly, the computer system 600 for implementing the apparatus for assisting driving of the host vehicle according to the present embodiment may execute software stored in a memory and may be operable to determine the stop state of the host vehicle and the stop state of the preceding vehicle, to determine the start of the preceding vehicle by using the speed change and distance change of the preceding vehicle, and to notify the start of the preceding vehicle to the driver of the host vehicle.

In addition, the computer system 600 for implementing the apparatus for assisting driving of the host vehicle according to the present embodiment may execute software stored in a memory and may be further operable to reset or adjust the time-related reference values and distance-related reference values for determining the start of the preceding vehicle by using the driving habit of the driver which is confirmed in the case that the preceding vehicle start notification function is inactivated.

In addition, the computer system 600 for implementing the apparatus for assisting driving of the host vehicle according to the present embodiment may execute software stored in a memory and may be further operable to reset or adjust the time-related reference values and distance-related reference values for determining the start of the preceding vehicle by using the congestion condition of the road or the driving state of the other vehicle existing around the host vehicle.

The apparatus and method according to embodiments of the present disclosure may be implemented in the form of program instructions that may be executed on various computer means and recorded on a computer readable medium. The computer readable medium may include program instructions, data files, data structures, and the like, alone or in combination thereof.

The hardware devices described above may be configured to operate as at least one software to perform the operations of this disclosure, and vice versa.

The above description is an example that explains the spirit of the present disclosure and may be changed and modified in various ways without departing from the basic features of the present disclosure by those skilled in the art. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. An apparatus for assisting driving of a host vehicle, the apparatus comprising:
    at least one vehicle sensor configured to:
        detect a driving state of the host vehicle, and
        acquire information of an exterior of the host vehicle; and
    a controller configured to:
        communicably be connected to the at least one vehicle sensor,
        perform a preceding vehicle following function,
        receive information of the host vehicle and a preceding vehicle in front of the host vehicle from at least one vehicle sensor,
        determine a stop state of the host vehicle based on at least one of speed information of the host vehicle, accelerator pedal state information of the host vehicle, brake pedal state information of the host vehicle, or transmission gear state information of the host vehicle,
        determine a stop state of the preceding vehicle based on information of the stop state of the host vehicle, speed information of the preceding vehicle, and distance information between the host vehicle and the preceding vehicle,
        determine a start of the preceding vehicle after a stop of the preceding vehicle based on speed change information of the preceding vehicle and distance change information between the host vehicle and the preceding vehicle, and
        notify the start of the preceding vehicle after the stop of the preceding vehicle to a driver of the host vehicle if the preceding vehicle is determined to restart after the stop of the preceding vehicle.

2. The apparatus of claim 1, wherein the speed change information of the preceding vehicle is determined by at least one of a speed of the preceding vehicle or an acceleration time of the preceding vehicle, and
    wherein the controller is operable to determine the start of the preceding vehicle after the stop if at least one of a condition that the speed of the preceding vehicle is equal to or greater than a predetermined start speed of the preceding vehicle or a condition that the acceleration time of the preceding vehicle is equal to or greater than a predetermined acceleration time of the preceding vehicle is satisfied.

3. The apparatus of claim 1, wherein the distance change information of the preceding vehicle is determined by a change of a distance between the host vehicle and the preceding vehicle, and
    wherein the controller is operable to determine the start of the preceding vehicle after the stop if at least one of a condition that the distance between the preceding vehicle and the host vehicle after the stop of the preceding vehicle exceeds a predetermined start distance or a condition that the state that the distance between the preceding vehicle and the host vehicle exceeds the predetermined start distance is maintained for a predetermined distance change time is satisfied.

4. The apparatus of claim 1, wherein the controller is operable to:
    determine a traffic signal in front of the host vehicle based on traffic information or information from the at least one vehicle sensor, and
    determine the start of the preceding vehicle based on the traffic signal.

5. The apparatus of claim 4, wherein the controller is operable to:
   determine a driving path of the host vehicle based on at least one of turn indicator information of the host vehicle or navigation information,
   determine the traffic signal on the driving path, and
   determine that the preceding vehicle is not started if the traffic signal on the driving path is a stop signal.

6. The apparatus of claim 1, wherein the controller is operable to determine a congestion state of a road on which the host vehicle travels based on surrounding vehicle information including at least one of a speed of surrounding vehicle around the host vehicle or a distance between the host vehicle and the surrounding vehicle, and
   wherein the controller is operable to determine the start of the preceding vehicle by further using surrounding vehicle information including at least one of the speed of the surrounding vehicle around the host vehicle or a distance between the surrounding vehicle and the host vehicle if the road is in the congestion state.

7. The apparatus of claim 1, wherein the controller is operable to determine a congestion state of a road on which the host vehicle travels based on surrounding vehicle information including at least one of a speed of surrounding vehicle around the host vehicle or a distance between the host vehicle and the surrounding vehicle, and
   wherein the controller is operable to:
      reset reference values for determining the speed change information or the distance change information, and
      determine the start of the preceding vehicle by using the reset reference values.

8. The apparatus of claim 1, wherein the controller is operable to collect and store driving habit information of the driver of the host vehicle while the preceding vehicle following function is inactive, and
   wherein the controller is operable to set at least one of reference value for the speed information of the host vehicle for determining the stop of the host vehicle, the speed information of the preceding vehicle for determining the stop of the preceding vehicle, the speed change information or the distance change information, for determining the start of the preceding vehicle based on the driving habit information of the driver of the host vehicle.

9. A controller for assisting driving of a host vehicle, the controller comprising:
   a host vehicle stop determiner configured to determine a stop state of the host vehicle based on at least one of speed information of the host vehicle, accelerator pedal state information of the host vehicle, brake pedal state information of the host vehicle or transmission gear state information of the host vehicle;
   a preceding vehicle stop determiner configured to determine a stop state of the preceding vehicle based on information of the stop state of the host vehicle, speed information of the preceding vehicle, and distance information between the host vehicle and the preceding vehicle;
   a preceding vehicle start determiner configured to determine a start of the preceding vehicle after the stop of the preceding vehicle based on speed change information of the preceding vehicle and distance change information between the host vehicle and the preceding vehicle; and
   a start notifier configured to notify the start of the preceding vehicle after the stop to a driver of the host vehicle if the preceding vehicle is determined to restart after the stop.

10. A method for assisting driving of a host vehicle, the method comprising:
    determining a stop state of the host vehicle based on at least one of speed information of the host vehicle, accelerator pedal state information of the host vehicle, brake pedal state information of the host vehicle, or transmission gear state information of the host vehicle;
    determining a stop state of a preceding vehicle in front of the host vehicle based on information of the stop state of the host vehicle, speed information of the preceding vehicle, and distance information between the host vehicle and the preceding vehicle;
    determining a start of the preceding vehicle after the stop of the preceding vehicle based on speed change information of the preceding vehicle and distance change information between the host vehicle and the preceding vehicle; and
    notifying the start of the preceding vehicle after the stop to a driver of the host vehicle if the preceding vehicle is determined to restart after the stop.

11. The method of claim 10, wherein the speed change is determined by at least one of a condition that a speed of the preceding vehicle becomes equal to or greater than a predetermined start speed or a condition that the speed of the preceding vehicle is accelerated for greater than a predetermined acceleration time.

12. The method of claim 10, wherein a distance change is determined by at least one of a condition that a distance between the host vehicle and the preceding vehicle becomes equal to or greater than a predetermined start distance or a condition that the distance between the host vehicle and the preceding vehicle is changed for greater than a predetermined distance change time.

13. The method of claim 10, further comprising confirming a traffic signal in front of the host vehicle based on traffic information,
    wherein the determining the start of the preceding vehicle includes determining the start of the preceding vehicle by further using the traffic signal in front of the host vehicle.

14. The method of claim 13, further comprising confirming a driving path of the host vehicle based on at least one of driving data including a turn indicator information of the host vehicle or navigation information,
    wherein the confirming includes confirming the traffic signal on the driving path of the host vehicle, and
    wherein the determining the start of the preceding vehicle includes determining that the preceding vehicle does not start if the traffic signal on the driving path of the host vehicle is a stop signal.

15. The method of claim 10, further comprising determining a congestion state of a road on which the host vehicle travels based on surrounding vehicle information including at least one of a speed of a surrounding vehicle around the host vehicle or a distance between the surrounding vehicle and the host vehicle,
    wherein the determining the start of the preceding vehicle includes determining the start of the preceding vehicle by further using surrounding vehicle information including at least one of the speed of the surrounding vehicle around the host vehicle or the distance between the surrounding vehicle and the host vehicle if the road is in the congestion state.

16. The method of claim 10, further comprising determining a congestion state of a road on which the host vehicle travels based on surrounding vehicle information including at least one of a speed of the surrounding vehicle around the host vehicle and a distance between the surrounding vehicle and the host vehicle,
- wherein the determining the start of the preceding vehicle includes:
  - resetting reference values for determining the speed change information or the distance change information; and
  - determining the start of the preceding vehicle by using the reference values.

17. The method of claim 10, further comprising:
- collecting and storing driving habit information of the driver of the host vehicle while the preceding vehicle following function is inactive; and
- setting at least one of a reference value for the speed information of the host vehicle for determining the stop of the host vehicle, the speed information of the preceding vehicle for determining the stop of the preceding vehicle, the speed change information, or the distance change information for determining the start of the preceding vehicle based on the driving habit information of the driver of the host vehicle.

* * * * *